United States Patent
Marchante Moreno et al.

(10) Patent No.: US 7,322,078 B2
(45) Date of Patent: Jan. 29, 2008

(54) DRIVE DEVICE FOR A TRANSVERSE DRAWING SYSTEM FOR FILMS OF SYNTHETIC MATERIAL

(75) Inventors: Innocente Marchante Moreno, Le Bourget du Lac (FR); Gilbert Trivero, La Chavanne (FR)

(73) Assignee: Darlet Marchante Technologie S.A., Le Bourget du Lac (FR)

( * ) Notice: Subject to any disclaimer, the term of this patent is extended or adjusted under 35 U.S.C. 154(b) by 139 days.

(21) Appl. No.: 10/553,785

(22) PCT Filed: May 27, 2004

(86) PCT No.: PCT/FR2004/001318

§ 371 (c)(1),
(2), (4) Date: Dec. 2, 2005

(87) PCT Pub. No.: WO2004/108395

PCT Pub. Date: Dec. 16, 2004

(65) Prior Publication Data

US 2006/0180437 A1    Aug. 17, 2006

(30) Foreign Application Priority Data

Jun. 2, 2003  (FR) .................................. 03 06635

(51) Int. Cl.
*D06C 3/02*   (2006.01)
*B29C 55/08*  (2006.01)

(52) U.S. Cl. ............................................. 26/89; 26/93

(58) Field of Classification Search ................. 26/72, 26/73, 74, 89, 91, 92, 93, 95, 96, 98; 226/170, 226/173; 198/834, 835, 832

See application file for complete search history.

(56) References Cited

U.S. PATENT DOCUMENTS

| | | | |
|---|---|---|---|
| 3,276,071 A | | 10/1966 | Nagae et al. |
| 3,430,310 A | * | 3/1969 | Richbourg ..................... 26/91 |
| 3,590,450 A | * | 7/1971 | Pernick ........................ 26/92 |
| 3,755,862 A | | 9/1973 | Molz |
| 4,497,096 A | * | 2/1985 | Richter ......................... 26/74 |
| 4,614,011 A | * | 9/1986 | Nicholas et al. .............. 26/73 |
| 4,807,336 A | * | 2/1989 | Yoshimura et al. ........... 26/73 |
| 4,817,254 A | * | 4/1989 | Poterala ........................ 26/96 |
| 5,255,419 A | * | 10/1993 | Stanislaw et al. ............. 26/89 |
| 5,862,574 A | * | 1/1999 | Poterala ........................ 26/89 |

FOREIGN PATENT DOCUMENTS

| | | |
|---|---|---|
| FR | 1 318 130 | 2/1963 |
| FR | 2 686 041 | 7/1993 |
| GB | 1004563 | * 9/1965 |

* cited by examiner

*Primary Examiner*—Amy B. Vanatta
(74) *Attorney, Agent, or Firm*—Oliff & Berridge PLC

(57) ABSTRACT

The invention relates to drawing systems using a series of jaws for the support, transport and drawing of the film (2), which are supported and guided by rails and driven by endless chains (3), connecting the jaws between the above. Each chain (3) is driven by two toothed wheels (6,7) of large diameter (D), one wheel (6) located at the beginning of the forward run (4) and the other wheel (7) located at the rear end of the return run (5) of the chain (3). Each wheel (6,7) is provided with motorised rotational drive means, said means being synchronised with each other. Such a drive device finds application in high speed drawing machines.

7 Claims, 2 Drawing Sheets

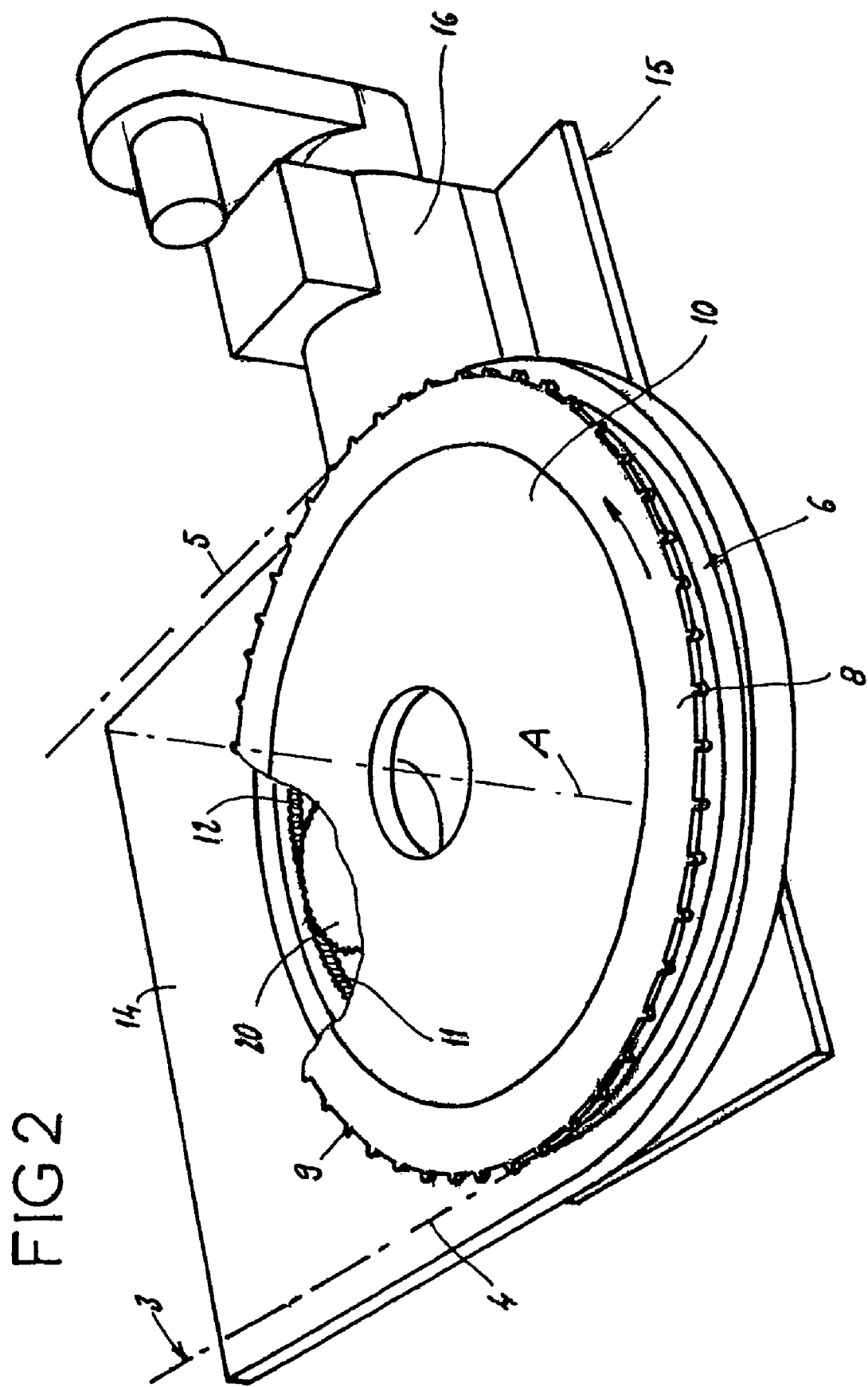

ated with handling the sheets of synthetic material.

DRIVE DEVICE FOR A TRANSVERSE DRAWING SYSTEM FOR FILMS OF SYNTHETIC MATERIAL

BACKGROUND OF THE INVENTION

The present invention relates in general to the technical field of the drawing of films made of synthetic material. This invention relates more particularly to a motorized drive device for a system for the transverse drawing of films of synthetic material, of the kind which, for holding, transporting and drawing the film, use successive grippers supported and guided by rails and driven forward by endless chains connecting the grippers together. Thus, the invention is more particularly still concerned with a device which, in this context, drives gripper-equipped chains forward.

DESCRIPTION OF THE PRIOR ART

The biaxially orientated films of synthetic material are obtained from an extruded strip, after material in the molten state has been deposited on a chilled casting drum so as to slow the crystallization of the film and allow its subsequent drawing.

The extruded strip then passes into a longitudinal drawing machine in which drawing is performed on the principle of a speed differential between various successive rolls. The strip then passes through a transverse drawing machine in which the strip is held by grippers mounted on chains, the separation of which gradually increases.

This type of drawing, known as sequential drawing, is perfectly suited to films made of numerous synthetic materials such as polypropylene, polyester, and is therefore widely used in industry.

Another important step in the method of manufacturing biaxially orientated synthetic films is the so-called transverse drawing phase which is performed inside a large oven. In this oven, two chains equipped with grippers and guide members move along the lateral rails, first of all parallel until the film has reached the desired temperature, then, for an adjustment of the guide rail, diverging from one another symmetrically so as to draw the film transversely. After the drawing, the guide rails return to a parallel or even slightly convergent configuration so as either to allow the drawn film to crystallize or, possibly, to allow thermal relaxation thereof.

Obviously, in order to achieve an objective of acceptable profitability that conforms to the needs of the market, the individual output of the machines needs to be increased, as this has the effect of reducing proportionally the cost of investment per kilogram of film produced, and the power consumption. This increase in capability can obviously be achieved only by increasing the width of the films or by increasing the production rate.

Until recently, it was the increase in film width that was favored because, on the one hand, of limitations inherent in the maximum rates of travel of the gripper and rail systems already developed and, on the other hand, because it is economically less expensive to design a wider machine, the expensive mechanical components remain the same regardless of the width of the machine.

This is why the widths of machines for producing biaxially orientated film which, ten years or so ago were no wider than 5 to 6 meters, are now commonly achieving widths of 8, 9 and even 10 meters.

It is difficult to envisage this trend continuing to be favored because beyond such widths difficult problems of supply and installation of surface treatment, or winding systems arise, or quite simply because of problems associated with handling the sheets of synthetic material.

For this reason, the current trend is once again to increase the production rate of the machines. This trend is made far easier by the appearance on the market of rail and gripper devices said to be continuous, such as those covered, for example by French patent no. 2686041 in the name of the Applicant.

Specifically, the installation of continuous guide means, combined with moving part systems involving chains or sliding as described in that patent, currently means that production rates of between 300 and 500 m/minute can currently be obtained.

These devices therefore mechanically allow the design and production of high-performance production machines combining a significant film width, namely one of 7, 8, 9 or even 10 meters, with a high mechanical production rate able to exceed 500 or even 600 m/minute.

However, it is obvious that if an additional requirement is for the quality of the films produced on high-speed machines to be at least comparable with or equivalent to that of the lower-speed earlier generation machines, it is then necessary for the length of the transverse drawing oven to be increased. This is because important and incompressible parameters of the method are, for example the residence time in the preheating zone of the oven which is needed so that the film is heated right through, and therefore draws uniformly, and this entails lengthening the preheating zone, or making the drawing more progressive which then entails lengthening the drawing zone and finally maintaining, at a higher production rate, a thermal stabilization time that is long enough to allow complete crystallization and therefore ensure the stability of the films produced, which means that the thermal stabilization zone needs to be lengthened.

The result of this combination of considerations is that high-speed transverse drawing machines need to be capable, through the quality of the components such as rails and grippers, in particular operating at high mechanical speeds, but also means that the corresponding length of the machines and the associated ovens need to be increased.

This desired lengthening of the transverse drawing machines is not without numerous problems, of which there are chiefly two:

The chains that synchronize the grippers are conventionally driven over the guide elements by sprockets driven via appropriate reduction gearboxes by a motorized shaft situated on the machine exit side, the moving equipment consisting of the chain and of the grippers being returned at the entry to the oven by another, non-driven, sprocket allowing the chain/grippers assembly, on return, to enter the oven again and transport the film.

The driven sprocket situated at the exit of the oven has therefore to drive the entity consisting of the chain and of the grippers not only in respect of the strand inside the oven but also in respect of the return strand, namely over a length approximately equal to twice the length of the machine concerned. This sprocket has therefore to transmit to the chain a drive force, the result of which is tension in the chain which needs to be higher than the forces that oppose this movement, namely the mechanical friction and the film drawing forces.

These forces are particularly high on high-speed machines during the phases of accelerating up to speed and of reducing speed, and the resulting tensions in the chain in some cases become unacceptable or too close to the rupture limit of the chains, and this results in very serious production incidents such as breakage or frequent derailment of the chain/grippers assembly.

This increase in the chain tension is damaging not only to the chain itself but also and especially to the self-lubricating rings which are increasingly being used on high-performance machines so that there is no need to lubricate the machine while it is running, this lubrication being done over a period of several years by self-lubricating rings. These rings ensure that the systems run perfectly provided that the rubbing surfaces are not subjected to an excessive specific pressure which would tend to crush the lubricating product and irreversibly damage it. Now, the specific pressure at the rings is directly proportional at the working tension of the chains.

Increasing the speeds at which a chain driven by a sprocket runs soon causes significant vibration to occur as a result of what is known as the polygon effect, this being a well-known effect resulting from the complex dynamics in the region where the chain comes into contact with the drive sprocket.

The only way of opposing this polygon effect is either to reduce the pitch of the chain, which has a significant impact on the cost of the machine, or to increase the diameter of the sprockets in order to reduce the so-called polygon effect.

This increasing of the diameter is not without its problems because the diameters of sprockets that are needed in order to reduce the polygon effect to an acceptable level become, for current production rates, greater than values of 1 meter or 1.5 meters.

Increasing the diameter of the sprockets beyond these values and such that it remains desirable for a machine operating at high speed, presents problems with the manufacture of the sprocket and with the flatness of the guidance, and also entails the presence between the sprockets and the motorized element of a reduction gearbox, the reduction ratio of which needs to be increasingly high because the greater the diameter of the sprocket wheel, the greater too is the relative difference between the rotational speed of the sprocket and the rotational speed of the drive shaft.

In the case of U.S. Pat. No. 3,276,071 or French patent no. 1318130, the machines concerned are simultaneous drawing machines, that is to say machines that perform longitudinal and transverse drawing, with chains the links of which are of variable length, and have to be driven at low speed. These documents are therefore not concerned with the objectives of the present invention. In addition, they provide no information regarding the sizing of the sprockets over which the chain is run.

SUMMARY OF THE INVENTION

The objective of the present invention is to alleviate this collection of disadvantages and allow rail, gripper and chain systems to be produced that run satisfactorily at high speed, specifically for transverse drawing machines.

To this end, the subject of the invention is a drive device for a system for the transverse drawing of films of synthetic material, of the kind indicated in the introduction, which is essentially characterized in that it comprises, for driving each endless chain connecting the grippers, at least two drive sprockets of large diameter, namely a drive sprocket situated at the front end of the "outbound" strand of the chain and another drive sprocket situated at the rear end of the "return" strand of the chain, there being associated with each sprocket motorized means for rotationally driving this sprocket and the motorized drive means associated with the two respective sprockets being synchronized with one another.

Hence, a first arrangement underlying the invention is to use sprockets of large dimensions, greatly in excess of the dimensions currently commonplace which are diameters of 1 meter to 1.5 meters, the sprockets driving the chains of the device that is the subject of the invention having a diameter greater than 1.5 meters.

A second arrangement underlying the invention is to use, for a chain, two drive sprockets, namely one sprocket situated at the entry to the transverse drawing system and one sprocket situated at the exit of the same drawing system, the two sprockets being driven, since each of them has its own rotational drive means.

These motorized means are, in particular, for each drive sprocket, a feedback-controlled electric motor, the two motors associated one with each of the two sprockets being synchronized in terms of speed and being feedback controlled in such a way that the torque needed to drive the endless chain is divided more or less equally between the sprocket situated at the entry to the transverse drawing system and the sprocket situated at the exit from the transverse drawing system.

This design makes it possible to ensure that each strand of the chain, namely the "outbound" strand and the "return" strand is driven directly by one of the two sprockets which is assigned to it, unlike in current devices in which both the strands, thus the "outbound" strand and the "return" strands are usually driven by a single sprocket, the other sprocket or sprockets being merely turn sprockets.

Thus, the drive device that is the subject of the invention allows the tension to which the chain is subjected to be reduced by half. The transverse drawing machine can therefore be used at high speed, retaining the conventional chain/gripper assembly design.

The solution according to the invention also makes it possible, on such high-speed drawing machines, to use self-lubricated chains without the pressure force at the rings, which is a result of the tension forces in the chain, exceeding acceptable limits.

According to another aspect of the invention, each drive sprocket of large diameter consists of an outer annulus with a tooth set tailored to suit the chain that is to be driven, and a fixed horizontal support part, the annulus and said support part being joined together by a collection of balls or of rollers providing rotational guidance of the outer annulus, while the support part is fixed horizontally to a support structure. By virtue of this arrangement, since the support part is fixed perfectly horizontally to a rigid support structure, the outer annulus of the sprocket, which guides and drives the chain, can also be sure to be held in a perfectly horizontal plane, in spite of its having a large diameter.

According to one advantageous embodiment, the outer annulus of each drive sprocket of large diameter bears an internal tooth set of a diameter similar to the outside diameter of said sprocket, with which tooth set there engages a motorized pinion of relatively small diameter itself rotationally driven by motorized means associated with the sprocket concerned.

This type of drive, using a motorized pinion engaging with an internally toothed annulus, has the additional advantage of producing a speed reducer, the reduction ratio of which increases with the increase in diameter of the drive sprocket and the comparative decrease in diameter of the motorized pinion. Thus, the motorized pinion rotates at a relatively high speed, which means that it can be either rotationally driven directly by the output shaft of the motor associated with the sprocket concerned or rotationally driven by a reduction gearbox with or without a right-angle gear, which reduction gearbox is of a relatively small size.

BRIEF DESCRIPTION OF THE DRAWINGS

The invention will be better understood with the aid of the description which follows, with reference to the attached schematic drawing, depicting by way of example, one embodiment of this drive device for a system for the transverse drawing of films of synthetic material:

FIG. 2 is a perspective view of a sprocket wheel and of its rotational drive;

DESCRIPTION OF THE PREFERRED EMBODIMENT

Figure 1:
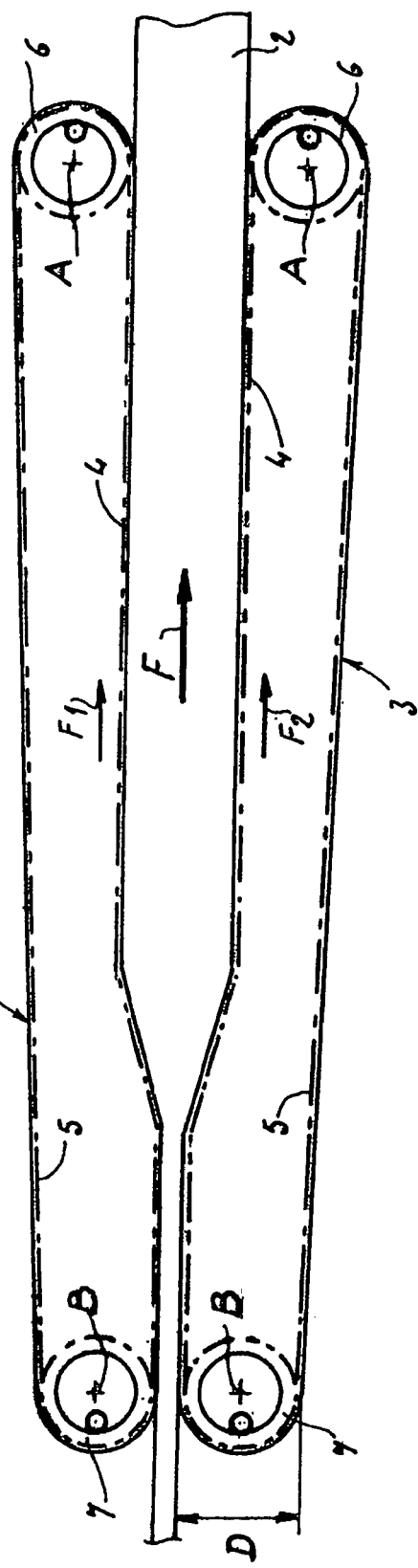
FIG. 1 is a highly schematic overview, in plan, above of a drawing machine provided with a device that forms the subject of the invention.

FIG. 1 gives a highly schematic overview of a machine for the transverse drawing of films. In such a machine, the film 2 that is to be drawn is transported in the direction of the arrow F, so that it passes in succession through the successive zones (not detailed here) of a temperature-controlled chamber in which the film 2 is drawn longitudinally then transversely.

To hold and transport the film 2 the latter is gripped, along its two opposite edges, using grippers the structure of which is known and may, in particular, be in accordance with that described in the aforementioned French patent no. 2 686 041. These grippers are borne by two endless chains 3 positioned symmetrically with respect to the longitudinal axis of the drawing machine and driven in the direction of the arrows F1 and F2 respectively. Each endless chain 3 comprises an active part, which is its inner chain 4, the chain 3 being returned by its outer strand 5. The two inner strands 4 belonging to the two chains 3 respectively comprise, in particular, divergent parts which correspond to the zone in which the film 2 is drawn transversely.

This invention is most specifically concerned with the device that drives the two endless chains 3. This drive device is described, in that which follows in respect of just one of the two chains 3 given the perfect symmetry of the system.

The drive device comprises two drive sprockets 6 and 7, of vertical axis A and B respectively, which are therefore themselves situated in the horizontal plane, these being:

a first sprocket 6 situated at the exit from the drawing machine, or in other words at the front end of the inner strand or "outbound" strand 4;

a second sprocket 7 situated at the entry to the drawing machine, or in other words at the rear end of the outer strand or "return" strand 5.

The two drive sprockets 6 and 7 have a large diameter D greater than 1.5 meters, the order of magnitude of which is, for example from 1.5 meters to 2.5 meters.

Figure 3:
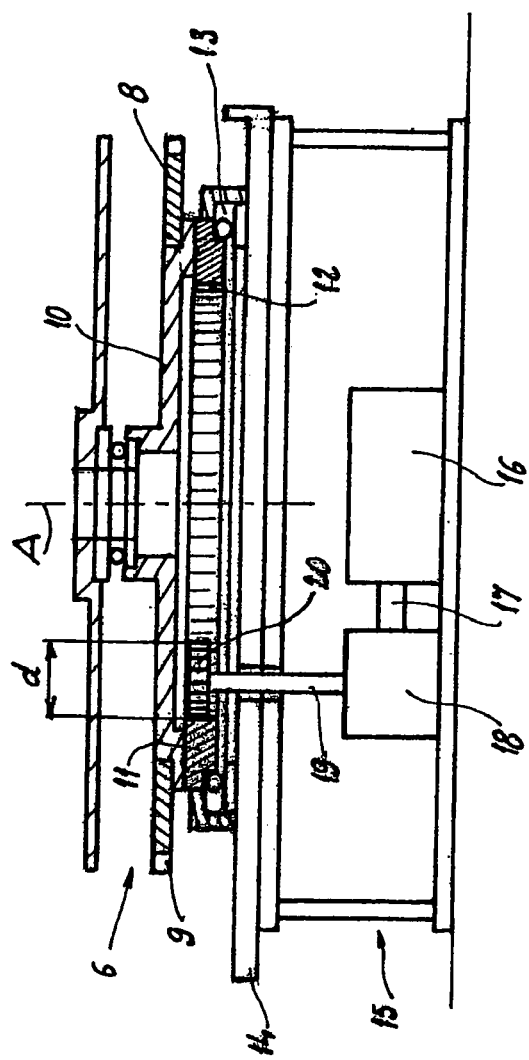
FIG. 3 is a view in vertical section of this drive device.

The structure and the rotational drive means of one of the sprockets 6 will now be described with reference to FIGS. 2 and 3, the other sprocket 7 having a similar structure and similar drive means.

The actual sprocket 6, comprises an outer annulus 8, provided with an external tooth set 9 suited to the characteristics of the endless chain 3 that is to be driven which chain runs over this outer tooth set 9. The outer annulus 8 is secured to a central disk 10.

Mounted concentrically under the outer annulus 8 is an annulus 11 with an internal tooth set 12, used for the rotational drive of the sprocket 6.

The assembly formed by the two concentric annuluses 8 and 11 is mounted to rotate via a set of balls 13, borne by a horizontal support 14 belonging to a fixed support structure 15, the set of balls 13 also keeping the sprocket 6 in a horizontal plane.

The support structure 15 supports an electric servomotor 16, of which the horizontally positioned output shaft 17 acts on a geared reduction gearbox 18, with right-angle gear. The vertical output shaft 19 from the reduction gearbox 18 bears a relatively small-diameter motorized pinion 20 which engages with the internal tooth set 12 forming an additional reduction stage for the rotational drive of the sprocket 6 from the servomotor 16.

Considering the drawing machine in its entirety once again, on each side of this machine, the endless chain 3 is driven by the two sprockets 6 and 7, motorized as has just been indicated, the respective servomotors 16 of the two sprockets 6 and 7 being synchronized. The first sprocket 6 thus pulls the "outbound" strand 4 of each endless chain 3, while the second sprocket 7 pulls the "return" strand 5 of this chain 3.

The invention claimed is:

1. A drive device for a system for the transverse drawing of films of synthetic material for holding, transporting and drawing the film, successive grippers supported and guided by rails, and driven forward by endless chains connecting the grippers together, which comprises, for driving each endless chain connecting the grippers, at least two drive sprockets of a large diameter, namely a drive sprocket situated at a front end of an outbound strand of the chain and another drive sprocket situated at a rear end of a return strand of the chain, there being associated with each sprocket a motorized means for rotationally driving this sprocket and the motorized drive means associated with the two respective sprockets being synchronized with one another;

wherein each drive sprocket of large diameter consists of
an outer annulus with a tooth set tailored to suit the chain that is to be driven; and
a fixed horizontal support part, the annulus and said support part being joined together by a collection of balls or of rollers providing rotational guidance of the outer annulus, while the support part is fixed horizontally to a support structure.

2. The drive device as claimed in claim 1, wherein the large diameter of the drive sprockets for driving the chains is in excess of 1.5 meters.

3. The drive device as claimed in claim 1, wherein the motorized rotational drive means are, for each drive sprocket, a feedback-controlled electric motor, the two motors associated one with each of the two sprockets being synchronized in terms of speed and being feedback controlled in such a way that the torque needed to drive the endless chain is divided more or less equally between the sprocket situated at an entry to the transverse drawing system and the sprocket situated at an exit from the transverse drawing system.

4. The drive device as claimed in claim 1 wherein the outer annulus of each drive sprocket bears an internal tooth set of a diameter similar to the outside diameter of said sprocket, with which the tooth set there engages a motorized pinion of a smaller diameter relative to the large diameter of the drive sprocket itself rotationally driven by motorized means associated with the sprocket.

5. The drive device as claimed in claim 4, wherein the motorized pinion engaged with the aforementioned internal tooth set is rotationally driven directly by an output shaft of the associated motor.

6. The drive device as claimed in claim 4, wherein the motorized pinion engaged with the aforementioned internal tooth set is rotationally driven via a reduction gearbox with or without a right-angle gear.

7. The drive device as claimed in claim 2, wherein the motorized rotational drive means are, for each drive sprocket, a feedback-controlled electric motor, the two motors associated one with each of the two sprockets being synchronized in terms of speed and being feedback controlled in such a way that the torque needed to drive the endless chain is divided more or less equally between the sprocket situated at an entry to the transverse drawing system and the sprocket situated at an exit from the transverse drawing system.

* * * * *